Aug. 13, 1957    W. E. LYON    2,802,504
TIRE
Filed July 9, 1954
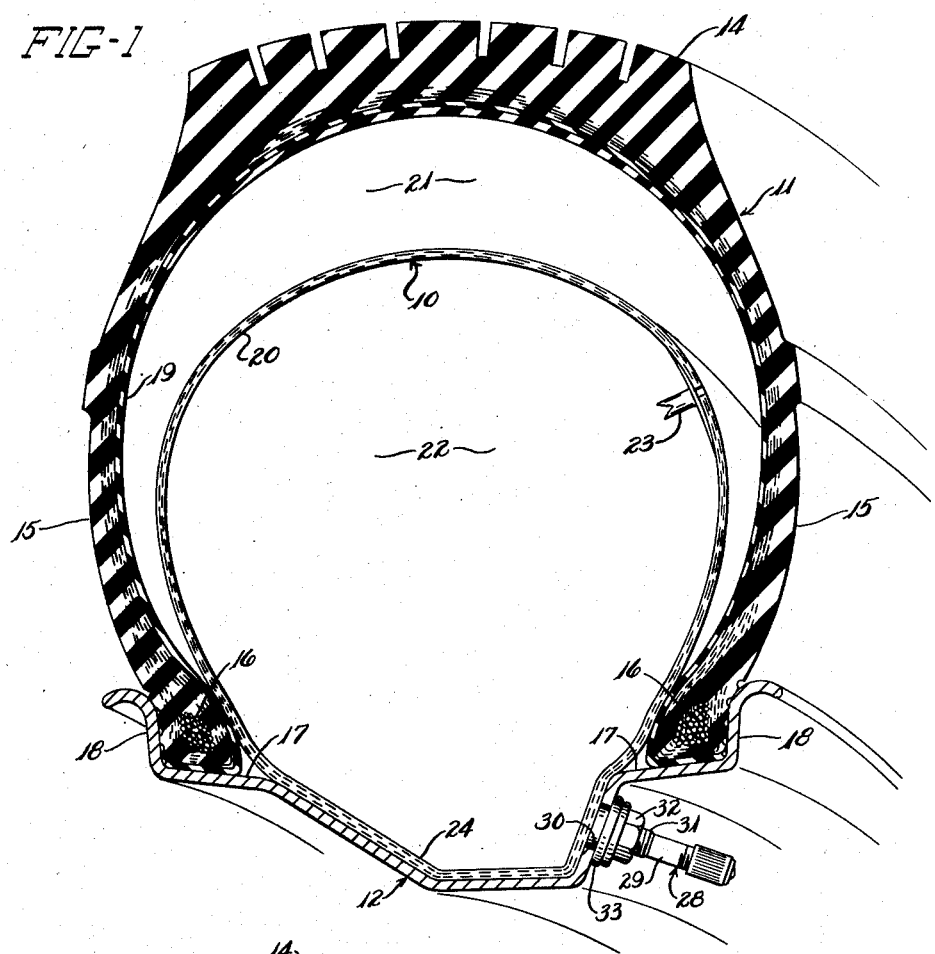
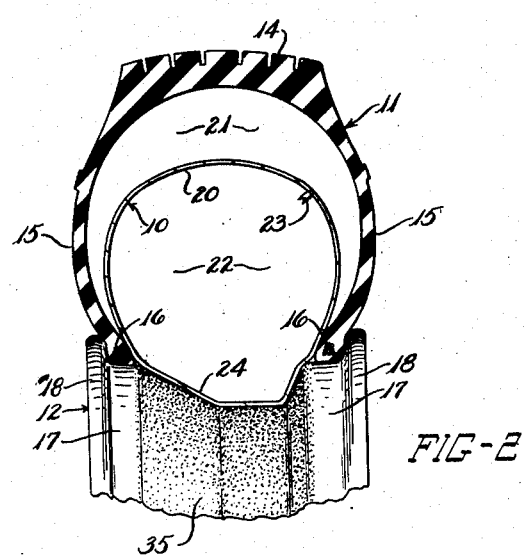
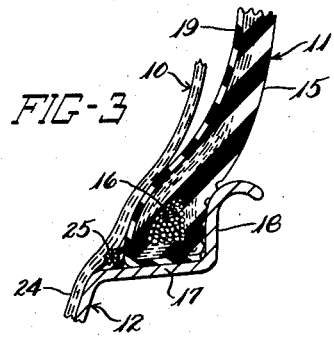
INVENTOR.
WALTER E. LYON
BY W. A. Fraser
ATTY.

United States Patent Office 2,802,504
Patented Aug. 13, 1957

2,802,504

TIRE

Walter E. Lyon, Akron, Ohio, assignor to The Firestone Tire & Rubber Company, Akron, Ohio, a corporation of Ohio Application July 9, 1954, Serial No. 442,381

1 Claim. (Cl. 152—341)

This invention relates to tubeless tires and more particularly to improved safety members adapted to provide blowout protection for such tires.

The co-pending application of King and Coben, Serial No. 194,129, filed November 4, 1950, now Patent No. 2,713,371 points out the advantages of safety members for tubeless tires and describes the construction of one such safety member which has enjoyed commercial success. Such members divide the interior of a tire into two compartments so that in the event of a blowout, with the explosive release of air from the outer compartment, air is retained within the inner compartment to give support to the blownout tire and thereby enable the driver to retain control of the car.

An objection to the King and Coben diaphragm is that a specially molded tire is required to secure and position the safety diaphragm properly therein. The present invention avoids this objection by providing a safety member which can be used with any tubeless tire of conventional construction. The member takes the form of a small complete tube having a substantially inextensible outer portion which preferably is of rubberized fabric and having an inner portion which is also preferably of rubberized fabric but which may be of rubber alone. The outer portion of the tube extends from points adjacent the lower sidewalls of the tire and is spaced from the interior walls of the tire so as to define an outer compartment therewith. The inner portion of the tube is adapted to lie closely adjacent the rim and according to the present invention is bonded firmly thereto in order to provide a stable construction which will give adequate blowout protection and which will at the same time retain the tubular safety member in place against the centrifugal forces and other forces of service which tend to displace it.

The construction has many advantages. The complete tubular form provides ease of mounting and eliminates the troubles of inflating which are ordinarily encountered in tubeless tires. Securing the tube to the rim prevents bodily displacement of the tube and prevents chafing and imbalance. An effective safety member is thus provided which does not require a specially molded tire.

It is a general object of the invention to provide a safety member for tubeless tires to give security in the event of a blowout without sacrificing the comfort of or other qualities of the ride and performance of the tire.

Another object is to provide a safety member which can be used with conventional tubeless tires and which does not require any special molded features in the tire or any other special accessories or features to hold it in place.

Another object is to provide a safety member for tubeless tires which can be securely positioned within the tire and which will retain its balance and stability so as to enable the tire to run smoothly without objectionable vibration.

Another object is to provide a safety member construction for tubeless tires which can effectively resist the centrifugal forces of operation so as to maintain its position within the tire.

Another object is to provide a safety member for tubeless tires which is easy to mount and inflate and which enables the tubeless tire itself to be more easily mounted and inflated.

Yet another object is to provide a safety member for tubeless tires which is cheap and easy to manufacture.

Further objects and advantages will be more fully apparent from the following description of a preferred form of the invention, reference being had to the accompanying drawings in which:

Figure 1 is a transverse radial section of a tubeless tire mounted on a drop-center rim assembled with a safety member embodying the invention;

Figure 2 is a view on a smaller scale of a rim with a portion of the tire and safety member broken away to show the manner in which adhesive is applied to the rim to hold the safety member in place; and Figure 3 is a fragmentary sectional view showing an alternate form of the invention.

Now referring to the drawings, the invention is shown embodied in a tubular safety member, indicated generally at 10, which together with a conventional tubeless tire 11 is mounted on a drop-center rim 12. The details of construction of the tire need not be described for they are well known to those skilled in the art. It is sufficient to say that the tire has the usual tread 14, sidewalls 15 and beads 16 which are seated on the rim surfaces 17 adjacent the flanges 18 of the rim. An impervious lining 19 of butyl rubber composition covering the inside of the tire serves to retain air within the tire.

The safety member 10 is in the form of a complete tube comprising preferably a substantially inextensible outer portion 20 of two plies of bias-laid rubberized fabric which extends outwardly from points adjacent the lower portions of the sidewalls of the tire, to divide the interior of the tire into an outer compartment 21 and an inner compartment 22 comprising the interior of the tire. A flutter valve 23 of conventional construction is mounted in the wall 20 to provide communication between the two compartments. An inner portion 24 also of double-ply rubberized fabric with cords extending at an angle of 45° lies adjacent the rim and completes the tubular form of the safety member. In the preferred form of the invention the tube is not reinforced. However, if desired, the tube may be reinforced by a pair of identical circumferential wire beads 25 located at the juncture of the portions 20 and 24 and adapted to seat on the rim adjacent the tire beads, see Figure 3.

The tire is inflated by means of an inflation valve 28 secured to the inner portion 24 and having a stem 29 which protrudes through a hole 30 in the wall of the drop center rim 12. The valve stem is externally threaded as indicated at 31 to receive a nut 32 which when screwed down tight compresses a resilient washer 33 and seals the aperture 30. The nut also tends to hold the valve 28 securely in the proper position, although, as will be noted, there is little tendency for the tube and its valve to shift position in the tire.

A feature of the present invention is the bonding, by cementing and/or vulcanizing, of the tube 10 to the drop-center well portion of the rim 12. Securing the tube directly to the rim has a number of advantages. If beads such as the beads 25 are provided the beads will be retained securely on the seats 17. Also, the inner portion 24 will be held firmly against the rim, successfully opposing the tendency of the inner portion to throw radially outwardly in response to the centrifugal forces of operation.

In use, the drop-center well portion of the rim is thoroughly cleaned and is painted with three coats of an air-curing neoprene-base cement 35, see Figure 2, which is allowed to dry for a few minutes. A suitable cement is disclosed in the co-pending application of Wm. Tann, Serial No. 350,751, filed April 23, 1953. The tube 10 is then mounted on the rim by the use of conventional tire mounting apparatus, taking advantage of the drop-center well portion of the rim to pass the tube over the rim flanges. The valve stem 29 is pulled through the hole 30 in the rim and a quick burst of air at high pressure is introduced through the valve into the tube with sufficient speed to cause the flutter valve 23 to close. Thereafter air under pressure is introduced into the tube until the pressure builds up to a level of about 50 lbs. per sq. inch. This internal pressure expands the tube and forces the inner portion 24 into intimate contact with the drop-center well portion of the rim causing it to adhere to the cemented rim. The assembly is allowed to stand for about 24 hours. After the tube is firmly cemented to the rim, the tube is deflated and the tire is then mounted on the rim in the usual manner. Air is then introduced into the tube slowly so that the flutter valve 23 remains open permitting air to pass into the outer compartment. In use, rotation of the wheel would throw the tube bodily centrifugally outward if the tube were not anchored in place by some means. In the present invention the cement effectively secures the tube to the rim providing the desired and necessary stability.

Various modifications of the invention will no doubt occur to those skilled in the art without departing from the spirit and scope of the invention, the essential features of which are summarized in the claim below.

What is claimed is:

The combination of a tubeless tire, a drop-center rim and a safety member adapted to provide protection against blowouts, said tire comprising a tread, sidewalls and beads, said tire beads being seated respectively on annular seats adjacent the side flanges of said rim, said safety member comprising a closed tube substantially smaller than the tire and mounted within the tire adjacent said rim and having a radial inner portion of flexible material terminating in a pair of inextensible circumferential beads seated on said annular seats, said flexible material of the inner portion being bonded firmly to the drop center portion of the rim between said annular seats to anchor the tube against bodily outward movement in a radial direction with respect to the rim and having an outer portion of flexible, substantially inextensible material extending from points adjacent the outer edges of said drop center well portion across the interior of the tire to divide the interior of the tire into an outer compartment defined by the interior walls of the tire and said outer portion and an inner compartment defined by said inner and outer portions, means in said outer portion providing for the passage of air between said compartments and a valve extending through said rim for admitting air under pressure to said tire and safety member.

References Cited in the file of this patent
UNITED STATES PATENTS

| | | |
|---|---|---|
| 2,410,209 | Godsey | Oct. 29, 1946 |
| 2,554,815 | Church | May 29, 1951 |
| 2,674,291 | Campbell | Apr. 6, 1954 |